(12) United States Patent
Chauncey et al.

(10) Patent No.: US 8,044,794 B2
(45) Date of Patent: Oct. 25, 2011

(54) MOBILE WIRELESS COMMUNICATIONS DEVICE BLOCKER AND ASSOCIATED METHODS

(75) Inventors: David Chauncey, Fairport, NY (US); Robert Bates, Reading (GB); Benjamin Randisi, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 447 days.

(21) Appl. No.: 12/187,982

(22) Filed: Aug. 7, 2008

(65) Prior Publication Data

US 2010/0033312 A1 Feb. 11, 2010

(51) Int. Cl.
    *G08B 1/08* (2006.01)
(52) U.S. Cl. ............ 340/539.11; 340/539.1; 455/1; 455/230; 455/456.4
(58) Field of Classification Search .......... 340/539.11, 340/539.1, 426.16, 426.19, 425.2, 436; 455/1, 455/230, 344, 414.1, 63.1, 456.4
    See application file for complete search history.

(56) References Cited

U.S. PATENT DOCUMENTS

| | | | |
|---|---|---|---|
| 6,664,932 B2 | 12/2003 | Sabet et al. | 343/770 |
| 6,687,497 B1 * | 2/2004 | Parvulescu et al. | 455/420 |
| 6,690,940 B1 | 2/2004 | Brown et al. | 455/456.4 |
| 6,771,946 B1 | 8/2004 | Oyaski | 455/345 |
| 6,873,824 B2 * | 3/2005 | Flick | 455/41.2 |
| 6,912,399 B2 | 6/2005 | Zirul et al. | 455/463 |
| 7,050,796 B2 | 5/2006 | Humphrey et al. | 455/420 |
| 7,123,874 B1 | 10/2006 | Brennan | 455/1 |
| 7,181,229 B2 | 2/2007 | Singh et al. | 455/456.4 |
| 7,734,315 B2 * | 6/2010 | Rathus et al. | 455/569.2 |
| 7,738,831 B2 * | 6/2010 | Nath et al. | 455/1 |
| 7,742,005 B2 | 6/2010 | Villarroel et al. | 343/713 |
| 2004/0077339 A1 * | 4/2004 | Martens | 455/414.1 |
| 2005/0170850 A1 | 8/2005 | Edwards et al. | 455/456.4 |
| 2005/0255874 A1 | 11/2005 | Stewart-Baxter et al. | 455/550.1 |
| 2006/0067501 A1 | 3/2006 | Piatt | 379/210.02 |
| 2006/0270463 A1 | 11/2006 | Copperman | 455/567 |
| 2007/0032225 A1 | 2/2007 | Konicek et al. | 455/417 |
| 2007/0270122 A1 | 11/2007 | Ewell, Jr. | 455/404.2 |
| 2008/0305735 A1 * | 12/2008 | Farnsworth et al. | 455/1 |

FOREIGN PATENT DOCUMENTS

WO 2009/105666 8/2009

OTHER PUBLICATIONS

Bluelinx, "How Does Q-Zone Work?", www.bluelinx.com/qzonehow.html, 1 page, 2000-2007.
Bluelinx, "What is Q-Zone?", www.bluelinx,com/qzonewhat.html, 1 page, 2000-2007.

* cited by examiner

*Primary Examiner* — Hung T. Nguyen
(74) *Attorney, Agent, or Firm* — Allen, Dyer, Doppelt, Milbrath & Gilchrist, P.A.

(57) ABSTRACT

A vehicle wireless communications blocker may be used in a vehicle for an occupant's wireless communications device and may include a long-range and short-range wireless transceiver both coupled to a controller. The controller may be switchable between off-hook and on-hook states based upon control signals via the short-range wireless transceiver, and the occupant's wireless communications device may be blocked from occupant communication via the long-range transceiver when in the off-hook state. The blocker may include a housing to be installed in the vehicle, a short-range wireless transceiver carried by the housing to wirelessly communicate with the short-range wireless transceiver of the occupant's wireless communications device, and a controller carried by the housing and coupled to the short-range wireless transceiver to selectively switch the controller of the occupant's wireless communications device to the off-hook state so that the occupant's wireless communications device is blocked from occupant communication via the long-range transceiver.

22 Claims, 2 Drawing Sheets

MOBILE WIRELESS COMMUNICATIONS DEVICE BLOCKER AND ASSOCIATED METHODS

FIELD OF THE INVENTION

The present invention relates to the field of communications devices, and, more particularly, to mobile wireless communications devices and related methods.

BACKGROUND OF THE INVENTION

Automobile accidents are a major cause of death for people ages 15-19, and distractions, such as mobile phones, may be a major contributing factor. Phone conversations, dialing, and text messaging are several functions that may distract young drivers. Legislation that makes it illegal to operate a mobile phone while operating an automobile, and driver education may not be effective. Moreover, while it is an option for parents to take away their children's phone, or lock it away, etc., these options may deprive the children the use of the phone in emergencies and other urgent situations.

U.S. Patent Application No. 2006/0270463 to Copperman discloses a venue controlled disabling of capabilities of mobile communications devices. More particularly, Copperman discloses a cellular telephone having an additional receiver that receives one or more signals from a signal source that is connected to an on/off switch and/or vibrate switch. The phone can be turned on/off/vibrate with either the phone's external control, or by receiving a signal from a venue controlled source. The additional receiver and transmitter within the cellular telephone may communicate via an REF signal, infrared signal, sound signal, or chemical compound.

U.S. Patent Application No. 2007/0270122 to Ewell, Jr. discloses a system for disabling a mobile communicator. More particularly, a mobile communicator includes a locational tracking unit and a disabling circuit. The disabling circuit changes the mobile communicator from an enabled state to a disabled state. Further, the audible receiving and transmitting functions of the mobile communicator are disabled when the location of the mobile communicator as determined by the locational tracking unit satisfies at least one condition.

U.S. Pat. No. 7,123,874 to Brennan discloses a cellular phone blocker whereby a cellular phone jamming device is coupled to a vehicle's ignition. When the vehicle engine is running, a signal is transmitted by the cellular phone blocker to inhibit reception by the cellular phone. If a person wishes to use the cellular phone, the engine must be stopped. Such jammers may affect nearby phones, and may not be permitted in some jurisdictions.

Lastly, Q-Zone, offered by the Bluelinx Corporation of North Carolina, is a two-part system based on Bluetooth wireless technology. A software portion resides inside the mobile device itself, and a hardware node is installed in a venue. When a node encounters a mobile phone, the node sends a signal for the device to enter a quiet mode. Once the device leaves the node area, the previous settings are automatically returned.

Unfortunately, the prior art blocking systems may have certain drawbacks that include, but are not limited to implementation cost, and the ability to selectively communicate with certain parties when limited communication and/or blocking are desired. Accordingly, further improvements are desirable.

SUMMARY OF THE INVENTION

In view of the foregoing background, it is therefore an object of the present invention to provide a wireless communications blocking device for use in vehicles and related methods.

This and other objects, features, and advantages in accordance with the present invention are provided by a vehicle wireless communications blocker to be used in a vehicle for an occupant's wireless communications device including a long-range wireless transceiver and a short-range wireless transceiver both coupled to a controller. The controller may be switchable between off-hook and on-hook states based upon control signals via the short-range wireless transceiver. The occupant's wireless communications device may be blocked from occupant communication via the long-range transceiver when in the off-hook state.

Moreover, the vehicle wireless communications blocker may include a housing to be installed in the vehicle and a short-range wireless transceiver carried by the housing to wirelessly communicate with the short-range wireless transceiver of the occupant's wireless communications device. The vehicle wireless communications blocker may also include a controller carried by the housing and coupled to the short-range wireless transceiver to selectively switch the controller of the occupant's wireless communications device to the off-hook state so that the occupant's wireless communications device is blocked from occupant communication via the long-range transceiver. Accordingly, the vehicle wireless communications blocker selectively blocks wireless communications in a vehicle, and thus may be especially desirable to reduce distractions for young or inexperienced drivers.

The controller may be enterable into a registration mode to selectively register a given occupant's wireless communications device for selective blocking, for example. Still further, the controller may also selectively send a remote status message using the long-range transceiver of the occupant's wireless communications device. The vehicle wireless communications blocker may further include a vehicle positioning determining device carried by the housing and cooperating with the controller to send vehicle position information with the remote status message. The controller may also periodically selectively send the remote status message during operation of the vehicle. The controller may advantageously send the remote status message as a text message, for example, in some embodiments.

Additionally, the controller may selectively permit incoming signals via the long-range transceiver of the occupant's wireless communications device from predetermined parties. At least one input device may carried by the housing and cooperate with the controller to permit entry of the predetermined parties. Similarly, controller may selectively permit outgoing signals via the long-range transceiver of the occupant's wireless communications device to predetermined parties. Again, at least one input device may be carried by the housing and cooperate with the controller to permit entry of the predetermined parties.

The vehicle wireless communications blocker may further include a display carried by the housing and coupled to the controller, for example. The vehicle wireless communications blocker may also include an activation device coupled to the controller for activating selective blocking.

A method aspect is for blocking wireless communications of an occupant's wireless communications device in a vehicle. The method may include associating a short-range wireless transceiver in the vehicle to wirelessly communicate with a short-range wireless transceiver of the occupant's wireless communications device. The method may further include using a controller coupled to the short-range wireless transceiver to selectively switch the occupant's wireless communications device to an off-hook state so that the occupant's wireless communications device is blocked from occupant communication via a long-range transceiver of the occupant's wireless communications device.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
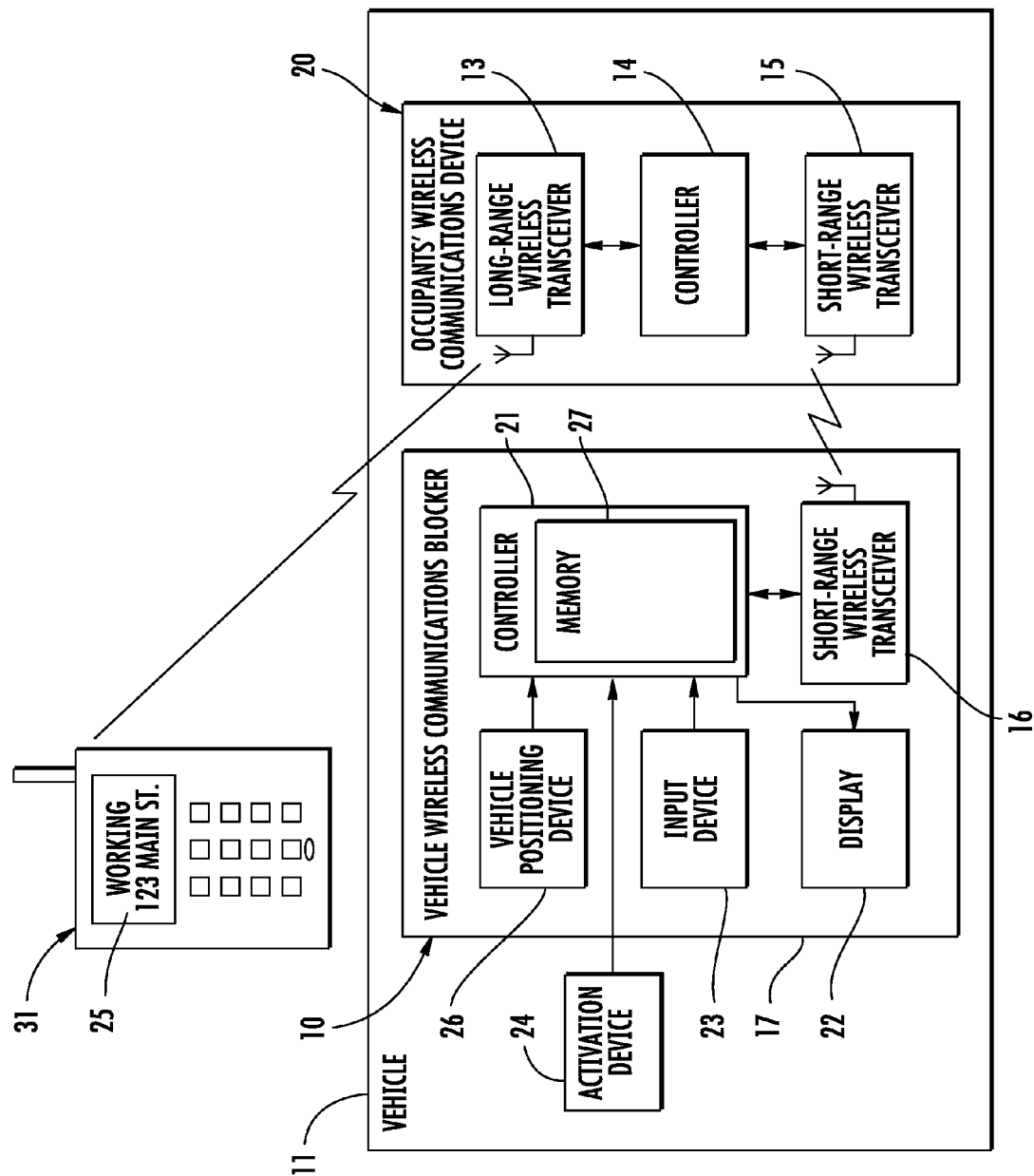
FIG. 1 is a schematic block diagram of a vehicle wireless communications blocker used in a vehicle for an occupant's wireless communications device in accordance with the present invention.

Referring initially to FIG. 1, a vehicle wireless communications blocker 10 is used in a vehicle 11 for an occupant's wireless communications device 20 including a long-range wireless transceiver 13 and a short-range wireless transceiver 15 both coupled to a controller 14. The controller 14 is switchable between off-hook and on-hook states based upon control signals via the short-range wireless transceiver 15. The control signals may be dedicated control signals, or may be in the form of handshaking signals exchanged between the wireless communications blocker 10 and the wireless communications device 20, for example. The occupant's wireless communications device 20 becomes blocked from occupant communication via the long-range transceiver 13 when in the off-hook state, as will be appreciated by those skilled in the art.

Switching between off-hook and on-hook states advantageously may not require changes to be made to the occupant's wireless communications device 20. Instead, an occupant initiating an outbound communication will receive no response from the occupant's wireless communications device 20 and/or network, for example. Moreover, a person attempting inbound communications will receive an indication similar to that received when the occupant's wireless communications device 20 is either in use, or not powered on. For example, an inbound phone call may be forwarded directly to voicemail. Additionally, switching between off-hook and on-hook states selectively allows inbound and outbound communications, as compared to simply blocking all communications, or powering down the occupant's wireless communications device 20, for example.

The vehicle wireless communications blocker 10 illustratively includes a housing 17 to be installed in the vehicle 11. The housing 17 may be a hard plastic case, for example, or other ruggedized material as will be appreciated by those skilled in the art.

The vehicle wireless communications blocker 10 also illustratively includes a short-range wireless transceiver 16 carried by the housing 17 to wirelessly communicate with the short-range wireless transceiver 15 of the occupant's wireless communications device 20. The short-range wireless transceivers, 15, 16 may communicate via the Bluetooth protocol, for example, or other short-range wireless communications protocol. By using a protocol such as Bluetooth, for example, operation of the vehicle wireless communications blocker 10 should not be limited to certain phone manufactures, as Bluetooth is widely used by many manufactures. A controller 21 is carried by the housing 17 and coupled to the short-range wireless transceiver 16 to selectively switch the controller 14 of the occupant's wireless communications device 20 to the off-hook state so that the occupant's wireless communications device is blocked from occupant communication via the long-range transceiver 13.

The vehicle wireless communications blocker controller 21 is preferably enterable into a registration mode to selectively register a given occupant's wireless communications device for selective blocking. In other words, the vehicle wireless communications blocker 10 is paired to or associated with the occupant's wireless communications device 20 through conventional pairing methods, such as pairing a wireless headset to the occupant's wireless communications device, for example. A password known and used by the parent, for example, may be used to limit access to the registration feature. Once registered, the vehicle wireless communications blocker 10 will automatically recognize the presence of the occupant's wireless communications device 20 and communicate therewith to provide selective blocking.

The controller 21 also selectively sends a remote status message 25 using the long-range transceiver 13 of the occupant's wireless communications device 20. The remote status message 25 may be sent periodically, at predetermined intervals or selectively, during an event change, and may include information such as whether the vehicle wireless communications blocker 10 is working properly, powered down, or being tampered with.

The controller 21 also may periodically selectively send the remote status message 25 during operation of the vehicle, and the controller may advantageously send the remote status message 25 as a text message, for example, in some embodiments to a remote wireless communications device 31 such as the parent's cell phone or wireless email device. Other types of message types may be sent by the controller 21 to other communications devices, as will be appreciated by those skilled in the art. Still further, other information regarding the status of the vehicle wireless communications blocker 10 may be sent, as will be appreciated by those skilled in the art. Sending a remote status message 25 advantageously provides peace of mind to parents, for example, that their child is not being distracted while driving. Similar assurances can be made for other drivers, such as a commercial driver, and an insurance discount may be available based upon using the vehicle wireless communications blocker 10.

The vehicle wireless communications blocker 10 also may include a vehicle positioning determining device 26 carried by the housing 17, or elsewhere in the vehicle, and cooperating with the controller 21 to send vehicle position information with the remote status message 25. The vehicle positioning determining device 26 may advantageously be a global positioning system (GPS), for example.

Still further, the controller 21 advantageously selectively permits incoming signals via the long-range transceiver 13 of the occupant's wireless communications device 20 from predetermined parties. This advantageously allows for communication with important parties, for example, parents of a teen driver, a dispatcher, or other authority figure. The input device 23 and the display 22 both cooperate with the controller 21 to advantageously permit entry of the predetermined parties.

Figure 2:
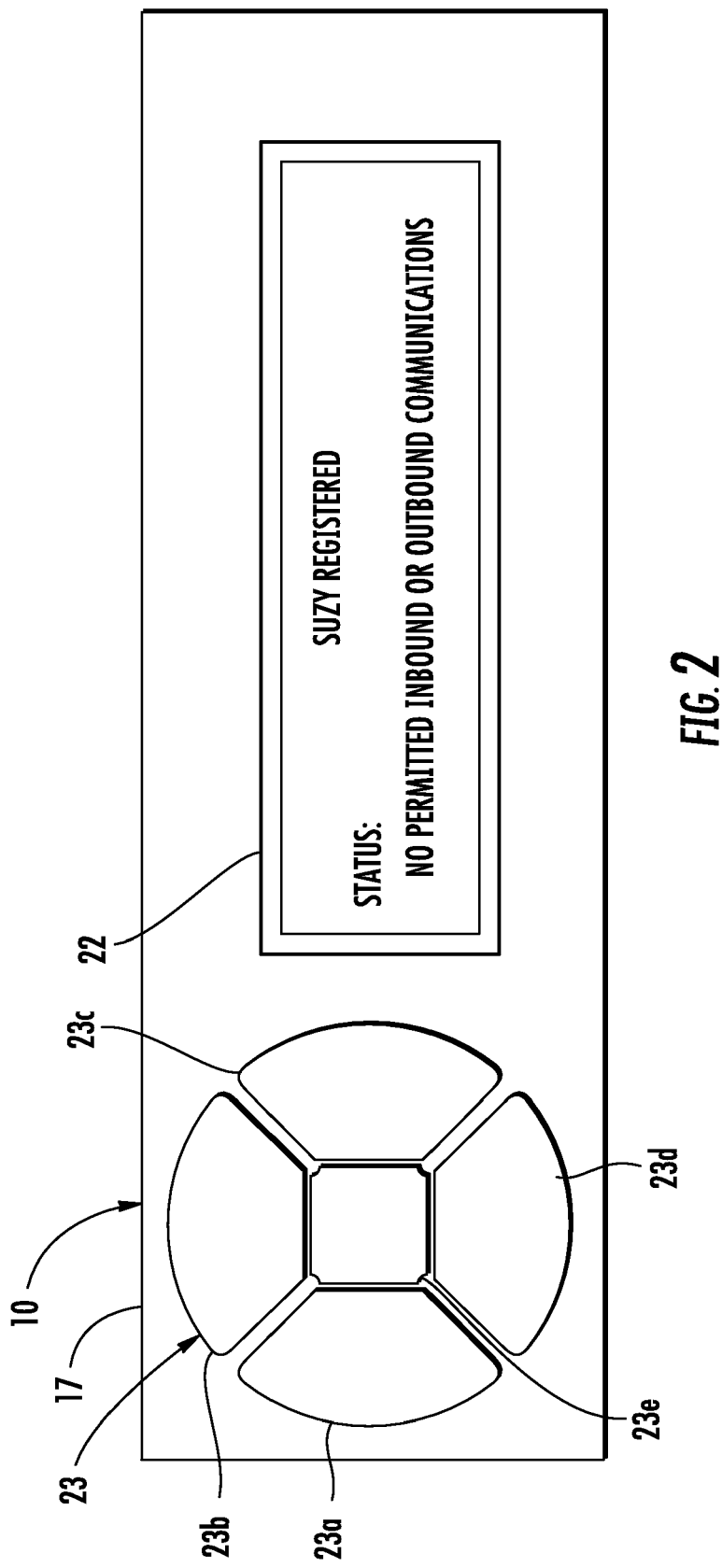
FIG. 2 is a front elevational view of the vehicle wireless communications blocker as in FIG. 1.

Referring now additionally to FIG. 2, the input device 23 illustratively includes control buttons 23a-23e to allow for easy programming of the predetermined parties. The display 22 can be a liquid crystal display, for example, or other display, and advantageously can display status information, such as, for example, who the vehicle wireless communications blocker is registered with, e.g. Suzy; and the current status. The display 22 can also display other information, as will be appreciated by those skilled in the art.

The input device 23 may be used to program the predetermined parties into the memory 27. Stored predetermined party data in the memory 27 may include a phone number, a device identifier (ID), or other identifying property, as will be appreciated by those skilled in the art.

The controller 21 similarly selectively permits outgoing signals via the long-range transceiver 13 of the occupant's wireless communications device 20 to the predetermined parties. The input device 23 may also cooperate with the controller 21 to permit easy entry of the predetermined parties for outgoing or outbound calls or messages. This advantageously allows for communication with important parties, for example, parents of a teen driver, a 911 emergency call center, or another emergency or authority figure.

Additionally, an activation device 24 is illustratively coupled to the controller 21 for activating selective illustratively blocking. The activation device 24 may be associated with the ignition switch, for example, that will activate the vehicle wireless communications blocker 10 when the vehicle 11 is operational. Still further, the activation device 24 may include a door pin and/or weight on seat to advantageously detect when an occupant is in the vehicle 11.

A method aspect is directed to blocking wireless communications of an occupant's wireless communications device 20 in a vehicle 11. The method may include associating a short-range wireless transceiver 17 in the vehicle 11 to wirelessly communicate with a short-range wireless transceiver 15 of the occupant's wireless communications device 20. The method may further include using a controller 21 coupled to the short-range wireless transceiver 16 to selectively switch the occupant's wireless communications device 20 to an off-hook state so that the occupant's wireless communications device is blocked from occupant communication via a long-range transceiver 13 of the occupant's wireless communications device.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A vehicle wireless communications blocker to be used in a vehicle for an occupant's wireless communications device including a long-range wireless transceiver and a short-range wireless transceiver both coupled to a controller, the controller switchable between off-hook and on-hook states based upon control signals via the short-range wireless transceiver, the occupant's wireless communications device being blocked from occupant communication via the long-range transceiver when in the off-hook state, the vehicle wireless communications blocker comprising:

a short-range wireless transceiver to wirelessly communicate with the short-range wireless transceiver of the occupant's wireless communications device; and a controller coupled to said short-range wireless transceiver to selectively switch the controller of the occupant's wireless communications device to the off-hook state so that the occupant's wireless communications device is blocked from occupant communication via the long-range transceiver.

2. The vehicle wireless communications blocker according to claim 1 wherein said controller is enterable into a registration mode to selectively register a given occupant's wireless communications device for selective blocking.

3. The vehicle wireless communications blocker according to claim 1 wherein said controller also selectively sends a remote status message using the long-range transceiver of the occupant's wireless communications device.

4. The vehicle wireless communications blocker according to claim 3 further comprising a vehicle positioning determining device cooperating with said controller to send vehicle position information with the remote status message.

5. The vehicle wireless communications blocker according to claim 3 wherein said controller sends the remote status message as a text message.

6. The vehicle wireless communications blocker according to claim 1 wherein said controller selectively permits incoming signals via the long-range transceiver of the occupant's wireless communications device from predetermined parties.

7. The vehicle wireless communications blocker according to claim 6 further comprising at least one input device cooperating with said controller to permit entry of the predetermined parties.

8. The vehicle wireless communications blocker according to claim 1 wherein said controller selectively permits outgoing signals via the long-range transceiver of the occupant's wireless communications device to predetermined parties.

9. The vehicle wireless communications blocker according to claim 8 further comprising at least input device cooperating with said controller to permit entry of the predetermined parties.

10. The vehicle wireless communications blocker according to claim 1 further comprising a display coupled to said controller.

11. The vehicle wireless communications blocker according to claim 1 further comprising an activation device coupled to said controller for activating selective blocking.

12. The vehicle wireless communications blocker according to claim 1 further comprising a housing carrying said short-range wireless transceiver and said controller.

13. A vehicle wireless communications blocker to be used in a vehicle for an occupant's wireless communications device including a long-range wireless transceiver and a short-range wireless transceiver both coupled to a controller, the controller switchable between off-hook and on-hook states based upon control signals via the short-range wireless transceiver, the occupant's wireless communications device being blocked from occupant communication via the long-range transceiver when in the off-hook state, the vehicle wireless communications blocker comprising:

a housing to be installed in the vehicle;

a short-range wireless transceiver carried by said housing to wirelessly communicate with the short-range wireless transceiver of the occupant's wireless communications device;

a controller carried by said housing and coupled to said short-range wireless transceiver to selectively switch the controller of the occupant's wireless communications device to the off-hook state so that the occupant's wireless communications device is blocked from occupant communication via the long-range transceiver;
an activation device coupled to said controller for activating selective blocking; and
a display carried by said housing and coupled to said controller.

14. The vehicle wireless communications blocker according to claim 13 wherein said controller is enterable into a registration mode to selectively register a given occupant's wireless communications device for selective blocking.

15. The vehicle wireless communications blocker according to claim 13 wherein said controller also selectively sends a remote status message using the long-range transceiver of the occupant's wireless communications device.

16. The vehicle wireless communications blocker according to claim 15 further comprising a vehicle positioning determining device carried by said housing and cooperating with said controller to send vehicle position information with the remote status message.

17. A method for blocking wireless communications of an occupant's wireless communications device in a vehicle, the method comprising:
associating a short-range wireless transceiver in the vehicle to wirelessly communicate with a short-range wireless transceiver of the occupant's wireless communications device; and
using a controller coupled to the short-range wireless transceiver to selectively switch the occupant's wireless communications device to an off-hook state so that the occupant's wireless communications device is blocked from occupant communication via a long-range transceiver of the occupant's wireless communications device.

18. The method according to claim 17 further comprising entering the controller into a registration mode to selectively register a given occupant's wireless communications device for selective blocking.

19. The method according to claim 17 further comprising using the controller to selectively send a remote status message using the long-range transceiver of the occupant's wireless communications device.

20. The method according to claim 19 further comprising sending vehicle position information with the remote status message.

21. The method according to claim 17 further comprising using the controller to selectively permit incoming signals via the long-range transceiver of the occupant's wireless communications device from predetermined parties.

22. The method according to claim 17 further comprising using the controller to selectively permit outgoing signals via the long-range transceiver of the occupant's wireless communications device to predetermined parties.

* * * * *